United States Patent

[11] 3,602,470

[72] Inventor Ralph K. Reynolds
  Saratoga, Calif.
[21] Appl. No. 828,551
[22] Filed May 28, 1969
[45] Patented Aug. 31, 1971
[73] Assignee FMC Corporation
  San Jose, Calif.

[54] HYDROPNEUMATIC SUSPENSION UNIT
  12 Claims, 22 Drawing Figs.
[52] U.S. Cl. .................................................. 280/124,
  267/15, 180/9.2
[51] Int. Cl. ...................................................... B60g 11/26
[50] Field of Search .......................................... 267/15;
  280/124; 180/9.2; 305/27

[56] References Cited
UNITED STATES PATENTS

| | | | |
|---|---|---|---|
| 2,970,832 | 2/1961 | Wordsworth | 267/15 A |
| 2,973,195 | 2/1961 | Armstrong | 267/15 A |
| 3,374,005 | 3/1968 | Danlon | 280/124 |
| 3,395,931 | 8/1968 | Piret | 180/9.2 X |

FOREIGN PATENTS
1,082,810 6/1960 Germany .................... 267/15 A

*Primary Examiner*—Philip Goodman
*Attorneys*—F. W. Anderson and C. E. Tripp ABSTRACT: A hydropneumatic wheel suspension unit including a pivotally mounted combined cylinder and strut wherein the strut encloses a reaction piston and carries the wheel near its free end. The gas cushion is provided by a bladder-type accumulator mounted within the strut adjacent the wheel spindle. The suspension unit, although intended for heavy-duty military vehicles, is light in weight and compact because the dual-purpose arm forms both a cylinder and wheel support. The accumulator is in a body of liquid which also extends throughout the hollow wheel spindle. Thus, the heat generated during operation of the suspension unit is dissipated into the wheel hub structure. A one-way valve mounted in the piston automatically compensates for normal leakage of hydraulic fluid past the piston by transferring the fluid between an internal reservoir of the strut at its pivot end, to the other side of the piston.

PATENTED AUG 31 1971 3,602,470

FIG_1

FIG_2
STATIC

FIG_3
BUMP

FIG_4
DROPOUT

INVENTOR.
RALPH K. REYNOLDS
BY F. W. Anderson
C. E. Tripp
ATTORNEYS

FIG_14

FIG_15

FIG_12

FIG_13

FIG_20

FIG_21

FIG_22

3,602,470

HYDROPNEUMATIC SUSPENSION UNIT

BACKGROUND OF THE INVENTION

The present invention concerns a wheel suspension unit of the type including a pivotally mounted, swinging wheel support arm in which the spring action is obtained by compressing a gas.

Prior art wheel suspension devices of the general type above referred to are disclosed in Reynolds U.S. Pat. No. 3,352,565 and Donlon et al. U.S. Pat. No. 3,374,005. In the former patent, a rotary hydraulic actuator is incorporated in the pivot hub of the wheel support arm. One disadvantage of this type of suspension unit, indicated during extensive military field tests, is that it is difficult to attain satisfactory service life and reliability because of the numerous dynamic seals and critical dimensional tolerances required in the rotary actuator. Other drawbacks are that the suspension unit is relatively costly, undesirably heavy, and space consuming for some applications. Further, the actuators are not strictly independent units, since internal leakage requires that they have hydraulic and mechanical connections to associated structure within the hull of the vehicle.

The Donlon et al. wheel suspension has self-contained hydraulic structure, but is complex and relatively costly. The Donlon et al. suspension unit has extremely small clearance with the wheel because it must substantially fill the open recess defined by the inside rim portion of the wheel. The clearance space will inevitably clog with caked mud and rocks or other material in off the road use. This impairs rotation of the wheel, and in a multiwheel vehicle can cumulatively cause a serious loss in propulsion efficiency. Furthermore, once this mud accumulation has taken place, the only effective cleaning method is to dismount the wheel.

Another problem encountered in heavy-duty hydropneumatic suspension systems is that considerable heat is generated in off the road use. Unless dissipated in some manner, this heat can be destructive to the various hydraulic seals and other elastomeric components, and can affect changes in dimensional tolerances due to thermal expansion. For this reason, many hydraulic suspension systems employ oil coolers or large reservoirs. However, these items occupy hull space which could more profitably be used for payload, and sometimes have connecting conduits which are relatively vulnerable to damage.

SUMMARY OF THE INVENTION

By combining the functions of wheel support and hydraulic cylinder in a wheel suspension strut, and by providing a linear arrangement of reaction piston and hydraulic accumulator in the strut, an inexpensive lightweight efficient and compact wheel suspension unit is provided. Another improved result is attained by unique heat transfer structure in which the wheel radiates heat generated within the suspension strut as it oscillates under operating conditions.

DESCRIPTION OF THE PREFERRED EMBODIMENTS

Figure 1:
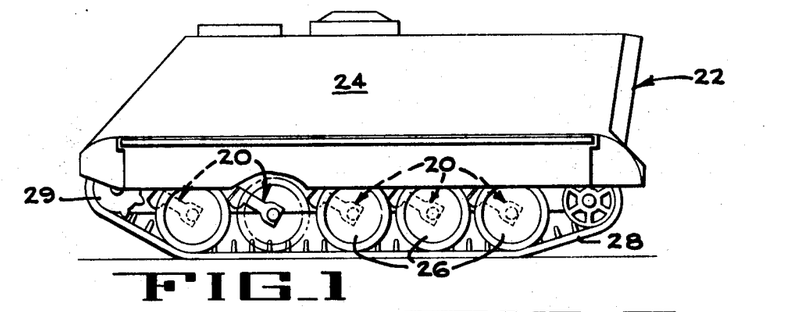
FIG. 1 is a diagrammatic side elevation of an amphibious personnel carrier employing the present wheel suspension units.

With reference to FIG. 1, the wheel suspension units 20 may be utilized with many existing types of military vehicles, such as with an amphibious personnel carrier 22 having an armored hull 24. Each suspension unit 20 is self contained and fixed to the exterior of the hull 24. Bogey wheels 26 carrying an endless track 28 are mounted on each left and right set of suspension units 20, each set comprising identical units, and the tracks are driven by powered front sprockets 29. The differences between the left and right suspension units will be obvious, and for this reason only one unit typical of those at the left side of the vehicle 22 is illustrated and described.

Figures 2, 3:
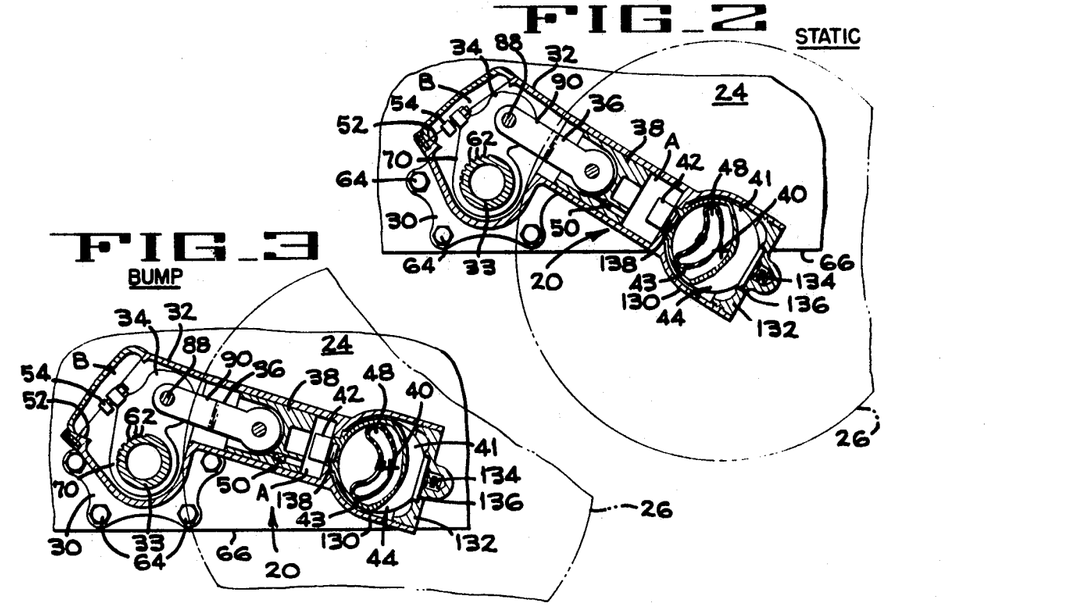
FIG. 2, 3 and 4, respectively, diagrammatically illustrate a static position, a partially raised or Bump position, and full DROPOUT or lowered position of one suspension unit.
Figure 4:
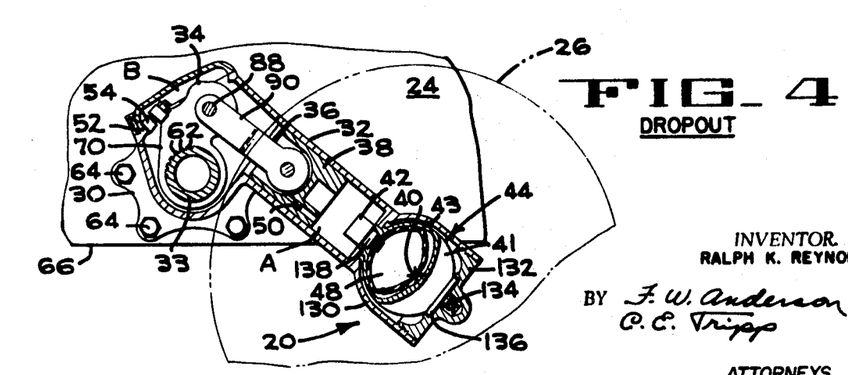

The general, known operating principles of the suspension units 20 are pointed out with reference to diagrammatic FIGS. 2–4. A mounting flange 30 secures the pivotal end of a hollow strut 32 to the hull 24. Rigidly secured to an internal, splined extension or hub 33 of the flange is an anchor arm (or bellcrank) 34, which carries a piston yoke or connecting rod 36. A piston 38 on the yoke 36 moves axially within the hollow strut 32 when the free end of the strut swings up and down in operation. In the present instance, the swinging motion results from the up and down motion of one of the bogey wheels 26 that is rotatable about a wheel spindle axis at 40 near the free end of the strut.

That portion of the hollow strut 32 between the piston 38 and a damper valve 42 which communicates with a spherical accumulator 44, contains a column of hydraulic fluid in a chamber A. The accumulator is a commercially available unit having a metallic shell 41 containing a flexible bladder 43 that encloses, at 48, a charge of gas under pressure. FIG. 2 shows a static condition wherein the gas in the accumulator balances the hydraulic fluid pressure.

FIG. 3 illustrates the hollow strut 32 pivoted upward, but not to the full limit of upward movement, by a lifting force directed against the bogey wheel 26. As the strut pivots upward, the piston 38 transfers hydraulic fluid into the accumulator through the damper valve 42, thus further collapsing the flexible bladder and further compressing the gas in the accumulator to obtain a spring action resisting upward displacement of the bogey wheel. When the bogey wheel is free to rebound to its former static position, the chamber A is enlarged by retraction of the piston, and the compressed gas expands the bladder of the accumulator to return fluid from the accumulator to chamber A. As so far described, the operation of the suspension unit 20 is in accord with known principles utilized in similar prior art devices. The strut 32 (FIG. 4) is enlarged around the anchor arm 34 to provide a reservoir chamber B for hydraulic fluid, and has an abutment ledge 52 which limits downward movement of the strut by striking a stop 54 on the anchor arm 34. When the bogey wheel rebounds to a position below the FIG. 2 static position, such as the maximum down position shown in FIG. 4, a unique hydraulic arrangement automatically replenishes any fluid which will ultimately leak past the piston 38 from the chamber A due to prolonged operation of the suspension unit 20. For this purpose, a check valve 50 is mounted in the piston 38.

The check valve 50 is operative to transfer fluid from the reservoir B to the chamber A whenever the pressure in the chamber is less than the pressure in the reservoir. This condition is satisfied during movement of the strut 32 to its FIG. 4 position where the abutment ledge 52 and stop 54 are interengaged. At this point of declination of the strut, the accumulator bladder 43 fills the shell 41.

It will be recognized, therefore, that if hydraulic fluid has leaked from the chamber A to the reservoir B after a long period of operation, that the bladder 43 will "bottom out" or in other words fill the shell 41 before the strut 32 attains its FIG. 4 position. Thus, movement of the strut 32 downward beyond the position at which the bladder 43 bottoms out will create a lower pressure in the chamber A than in the reservoir B, whereby the check valve 50 opens and transfers hydraulic fluid from reservoir B to chamber A to replace the amount of fluid leaked past the piston in the other direction. Since all open spaces within the suspension unit that confront the top of the piston are normally filled with fluid, the amount of fluid replaced will always be the amount which has leaked past the piston.

Figures 5, 7, 8:
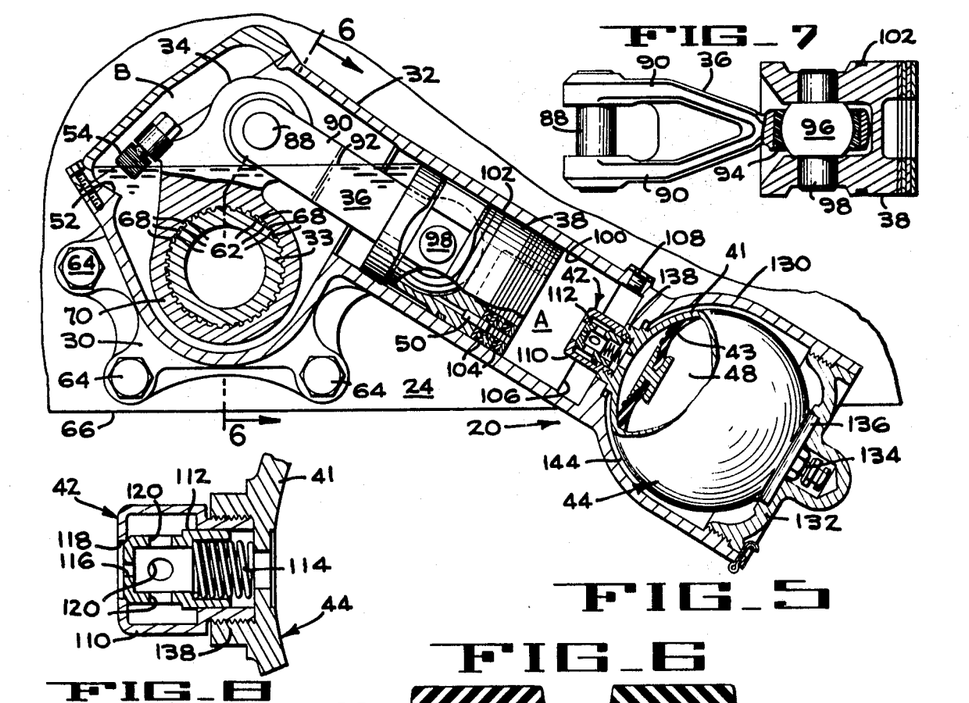
FIG. 5 is a longitudinal section through one of the suspension units shown in FIG. 1, with certain internal parts being in elevation but partly broken away.
FIG. 7 is a composite section and elevation of a piston and yoke shown in FIG. 5.
FIG. 8 is an enlarged fragmentary section of a damper valve shown in FIGS. 2–5.

With reference now to more specific structural arrangements and features of the suspension unit 20, FIG. 5 illustrates the unit in the FIG. 2 static position. As previously mentioned, the mounting flange 30 (FIG. 6) is formed with an integral hollow extension or hub 33 having a central annular array of external splines 62, and is secured by bolts 64 to the lower side of the hull 24 near its bottom wall 66. The hub 33 is hollow to minimize weight, and is capped by a welch plug 65 to prevent fluid from filling the hub. Because the hub does not contain fluid, its face which attaches to the hull does not require sealing. Internal splines 68 in an apertured end portion 70 of the anchor arm 34 lock the anchor arm in a selected angular position on the hub 33.

A flanged cylindrical bearing 72 is mounted on the hub 33 at each side of the interengaged splines 62 and 68. The bearings 72 may be formed on Teflon cloth which do not require lubrication, but which in the present case are lubricated by the hydraulic fluid in the reservoir B. Inwardly projecting journals 74 of an enlarged reservoir housing 76 of the strut 32 are rotatable on the bearings 72.

In order to axially retain the strut on the hub, the hub carries a split thrust ring 78 in an external groove, and a hub cap 80 bolted to the strut 32 overlies the thrust ring. Adjacent the inner bearing 72, the hub 33, the flange 30 and an adjacent outer surface of the reservoir housing 76 cooperatively define an annular chamber which encloses a dynamic seal ring 82. The seal ring is of a known commercial type having a metal to metal face seal, and prevents the intrusion of foreign matter to the bearings.

The upper end portion of the anchor arm 34 (FIGS. 5 and 6) is provided with a bearing unit which includes a spherical outer race 84 of Teflon cloth which circumscribes a substantially spherical metal ball 86. A pin 88 extends through the bearing unit and through two spaced arms 90 (FIG. 7) of the yoke 36. In the manner of a ball joint, the bearing unit accommodates any misalignment of the yoke arm 90 relative to the anchor arm 34. The bearing unit does not require lubrication, but in the present instance is splash lubricated by hydraulic fluid which under static conditions is at the level indicated at 92.

At its other end, the yoke 36 (FIG. 7) is provided with an identical bearing and pin assembly including a Teflon cloth race 94, a spherical ball 96, and a pin 98 which is mounted in the piston 38. The piston operates in a honed cylinder portion 100 of the strut 32 and carries a sealing ring assembly 102, of any suitable construction, to minimize leakage of hydraulic fluid from the chamber A to the reservoir B. To resist shock, an annular Lamiflex cushion 104 is secured to the closed end of the piston 38 so that when the strut 32 is pivoted upward beyond its FIG. 3 position, the cushion seats against a radial end wall 106 of the cylinder 100. Thus raised, the suspension unit 20 is in a "bumpout" position in which the bottom wall 66 of the hull is still clear of the ground and the vehicle is still mobile.

The cushion 104 is annular so that at bumpout position it circumscribes the damper valve 42 which is mounted in the end wall 106. This nesting arrangement of the damper valve and piston assembly minimizes the overall length of the strut. The piston sealing ring assembly 102 is located axially on the piston so that it does not conflict with the aperture for a filler plug 108 for chamber A when the piston abuts the wall 106. Damper valve 42 comprises an outer shell 110 (FIG. 8) having a neck which is threaded into the accumulator shell 41, and having an apertured end wall in the chamber A.

Internally, the damper valve 42 is provided with an axially displaceable throttle sleeve 112 which provides maximum flow toward the accumulator and a smaller flow in the reverse direction to provide a shock absorber action which allows the bogey wheel 26 to be rapidly displaced upwardly against the force of the gas cushion in the accumulator, and to be damped by the hydraulic fluid when it rebounds to its former position. Thus, the throttle sleeve 112 is biased toward the piston 38 by a compression spring 114, and has a small end wall aperture 116 to throttle flow from the accumulator to the chamber A. Flow in the other direction forces the throttle sleeve toward the accumulator, thus unseating the end wall of the throttle sleeve from a relatively large diameter aperture 118 in the end wall of the shell 110. Radial apertures 120 of the throttle sleeve transmit this larger volume flow to the accumulator.

An outwardly open bell-shaped end 130 of the strut housing encloses the accumulator 44 and is closed by a threaded plug 132. The plug is provided with a domed central portion which protects the gas valve 134 of the accumulator, and an interior cylindrical recess which circumscribes the accumulator neck 136. A neck portion 138 on the other end of the accumulator is seated in the end wall 106. A particular feature of the present invention is that the bell end 130 of the strut merges at one side into a hollow wheel spindle 140. The plug 132 may be replaced by a plate bolted onto the housing to facilitate charging of the accumulator.

Figure 6:
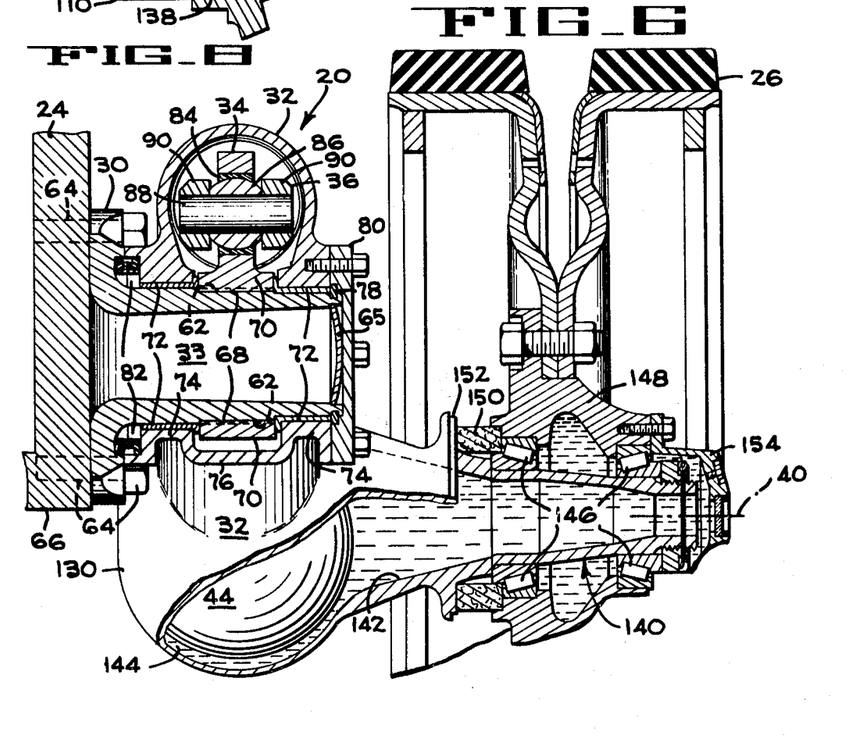
FIG. 6 is a section, indicated by the lines 6—6 on FIG. 5, of a complete suspension unit including a sectioned wheel and wheel hub.

As clearly shown in FIG. 6 the bore 142 of the spindle 140 communicates with a clearance passage 144 around the accumulator 44. Both the passage 144 and the bore 142 are filled with lubricating oil for roller bearings 146 that rotatably support a wheel hub 148. A dynamic seal ring assembly 150 provides for a fluidtight juncture of the rotatable hub with a fixed flange 152 on the spindle 140, and a hub cap 154 seals the outer end of the hub.

Off road use of a vehicle equipped with the same general type of suspension unit generates high temperatures in the accumulator. Thus, the special utility of the above described structure is that a large portion of this heat is transferred to the lubricating oil in the hollow wheel spindle, and from the oil into the bell end of the strut 32, the hub 148 and the wheel 26. Since these components are exposed to ambient temperature and comprise relatively large radiating surfaces, the heat buildup in the accumulator is substantially less than in a suspension system using an accumulator but lacking this important feature, with the result that deterioration due to, or abetted by, heat is minimized.

A further important feature of the suspension unit 20 is that the strut 32 forms both the swinging wheel support member and the cylinder for the piston. By eliminating the usually required separate piston cylinder, a substantial saving in weight and cost is realized. Elimination of a separate piston cylinder means, of course, that torsional loads on the strut 32 cause a slight deformation of the cylinder bore, but it has been discovered that such deformation can easily be kept well within the tolerances acceptable for free, efficient operation of the piston therein, provided that the piston is coupled by means of the disclosed self-aligning bearings and that suitable piston sealing rings are utilized. One efficient type of sealing ring is marketed under the trademark SHAMBAN and is formed with an inner nonelastomeric ring of circular cross section, and an outer ring of Teflon having an arcuate inner face to nest over the inner ring and prevent its extrusion from the ring groove under operating conditions. So arranged, the cylinder deformation does not develop other than normal forces in the piston rod 36.

Figures 12, 13:
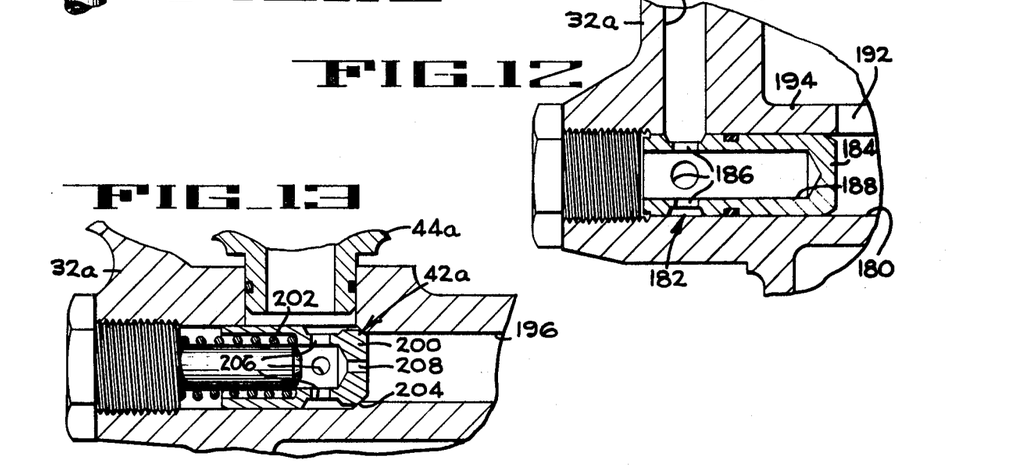
FIG. 12 is an enlarged section of a damper valve.
FIG. 13 is an enlarged section of a lockout valve.

In some instances it is desirable to be able to lock the suspension units to provide, for example, a stable firing platform. In other vehicles, it may be necessary to lock the suspension units in some predetermined elevational position such as in a multipurpose vehicle which includes a blade for earthmoving operations such as dozing, scraping and rough grading, and wherein the blade is elevationally adjusted by varying the ground clearance of the vehicle through its suspension units. The same advantages of the FIG. 2 suspension units can be embodied in both of these types of suspension units, and they are respectively illustrated in FIGS. 9–11, and in FIGS. 12 and 13.

The suspension unit 20a (FIGS. 9–11) incorporates a hollow strut 32a which is pivotally mounted on a splined hollow hub 33a that is secured to the hull 24a. The hull 24a has an aperture 162 that provides access to the interior of the hull for a conduit assembly 164. By means including a hydraulic pump, not shown, hydraulic fluid can be admitted to a presently described lockout control element to lock the piston 38a and thus immobilize the strut 32a.

Thus, the conduit assembly 164 is in communication with an internally threaded tubular neck 166 that is formed in an end wall 168 of the hub 33a. Extending between the neck 166 and the plain bore socket of a hub cap 80a is a floating, relatively flexible conduit 170, which readily accommodates any slight misalignment due to flexure of surrounding structure under operating conditions. Conventional O-rings circumferentially seal the end portions of the floating conduit. Because the end wall 168 of the hub 33a is rigid under all conditions and fixes that end portion of the floating conduit 170 except for some very small amount of possible axial movement, the conduit 170 is in effect a flexible cantilever extension of the wall 168. The other end of the bore 171 of the conduit 170 communicates with a passage 172 in an exterior boss 174 that is formed on the hub cap 80a.

Figure 10:
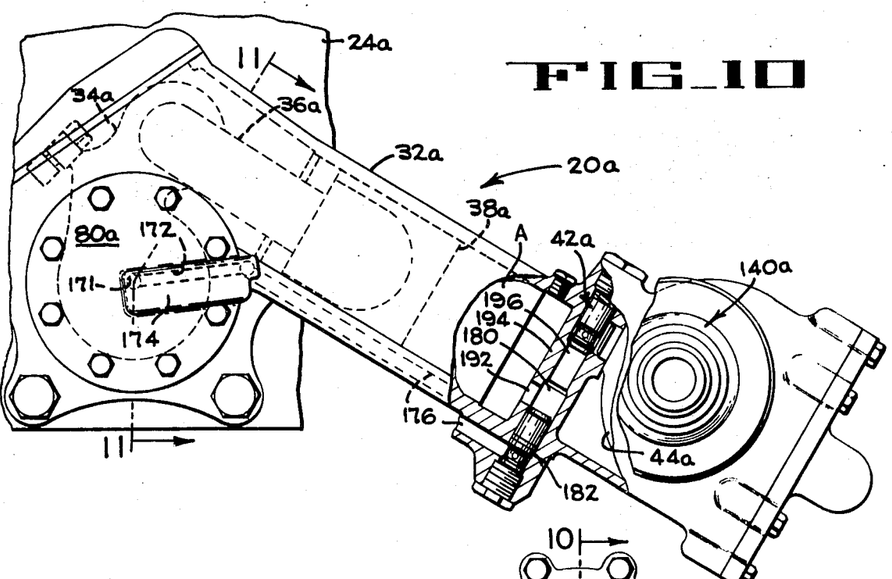
FIG. 10 is a section taken along lines 10—10 on FIG. 9.

As shown in FIG. 10, the boss 174 overhangs the circular edge of the hub cap 80a. At this point, the passage 172 extends inward, and at a gasket-sealed joint, not shown, communicates with a longitudinal passage 176 of the strut 32a. Intersecting the passage 176 near the location of an accumulator 44a is a radially extending passage 180 mounting a lockout piston valve 182. Best shown in FIG. 13, the valve 182 includes a central hollow cylindrical body or piston 184 having radial ports 186 that are exposed to fluid in the passage 176, and which communicate with the bore 188 of the piston. The piston is adapted to move axially within the passage 180.

When fluid under a pressure higher than the pressure of the fluid in chamber A is fed to the ports 186 from a lockout control, not shown, the piston 184 is projected into blocking relation with a port 192 in a wall 194. Because the port 192 is the controlling passage between the piston 38a and the accumulator 44a, no fluid transfer can occur between these elements and the suspension unit is locked in place until such time as the lockout control is actuated to release actuating pressure against the piston 184. The pressure of the fluid on the accumulator side of the wall 194 then returns the piston to its initial position, due to the fact that when the piston was moved across the port 192, it pressurized the fluid on the accumulator side of the wall slightly higher than the pressure in chamber A.

A damper valve 42a (FIGS. 10 and 12) controls the rate of fluid transfer between the accumulator and the piston to provide the shock absorber functions described for the valve 42 (FIGS. 2). The valve 42a is mounted in a passage 196 (FIG. 9) which intersects the passage 180, and operates to admit virtually unobstructed fluid to the accumulator, but to bleed the fluid toward the piston 38a at a lesser rate through restricting ports. referring to FIG. 12, the valve 42a includes an axially movable hollow cylindrical plug 200. Plug 200 is biased by a compression spring 202 to seat a beveled free end portion 204 on a valve seat formed in the passage 196 of the strut 32a. Flow toward the accumulator 44a depresses the plug 200 so that the plug does not block the flow, and reverse flow from the accumulator is through radial ports 206 that intersect an axial port 208 and throttle the flow.

All of the other operating components of the suspension unit 20a are similar to those described in connection with the suspension unit 20, and include a piston rod 36a, and an anchor arm 34a which is splined to the hub 33a. In particular, it is to be noted that the wheel spindle 140a is hollow and communicates with a chamber 144a enclosing the accumulator. Thus, the same advantageous heat transfer function already described is attained as the lubricating oil in the spindle carries off part of the generated heat of operation into a bogey wheel mounted on the spindle.

Figures 14, 15:
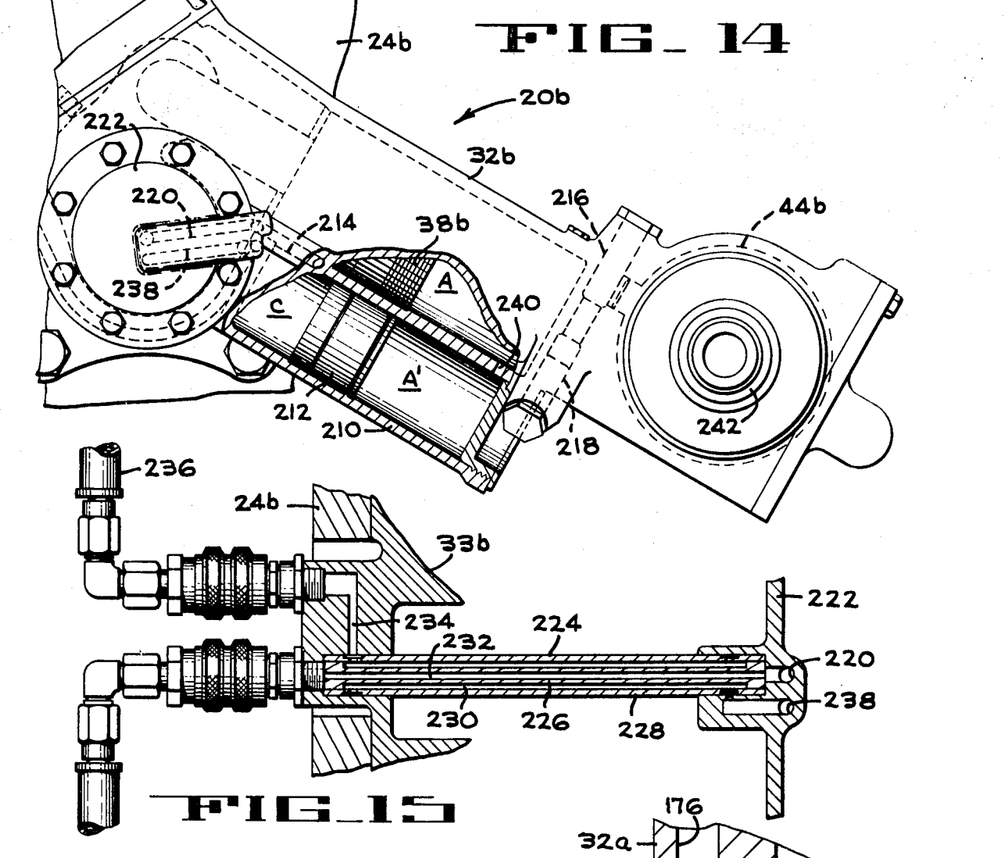
FIG. 14 is an elevation, partly broken away, of another embodiment of the suspension unit and incorporates power raising and locking functions.
FIG. 15 is a fragmentary transverse section through the hub portion of the suspension unit shown in FIG. 14.
Figure 16:
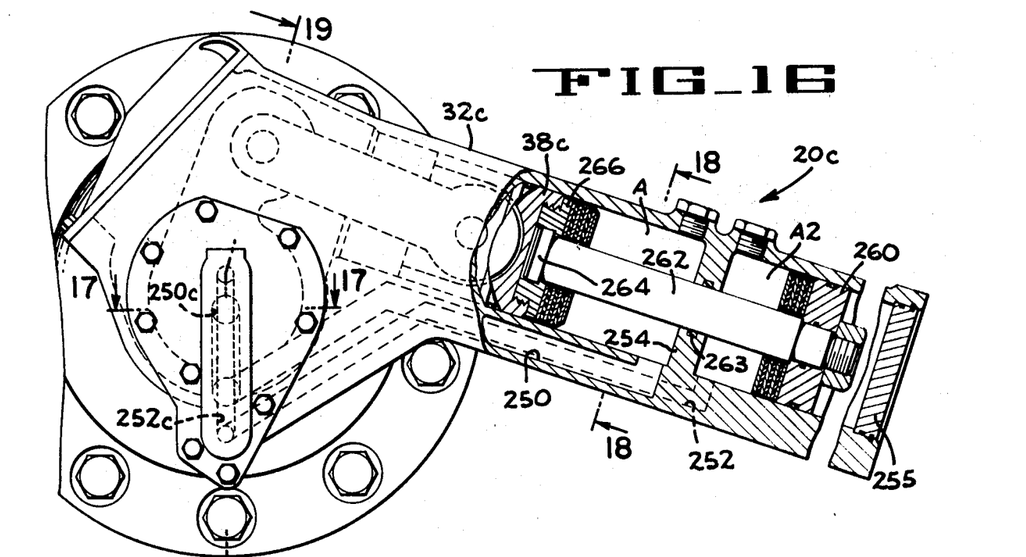
FIG. 16 is an elevation, partly broken away, of another embodiment of the suspension unit which operates with power actuation in each direction and has a separate accumulator.
Figure 17:
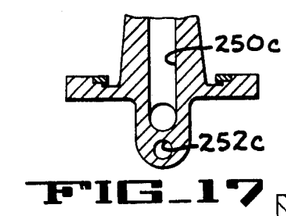
FIG. 17 is a section taken along lines 17—17 on FIG. 16.
Figure 18:
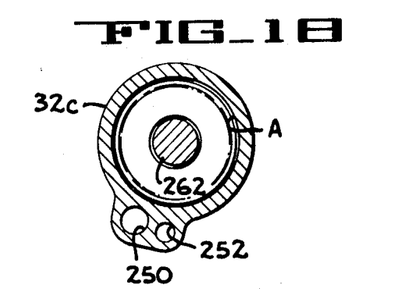
FIG. 18 is a section taken along lines 18—18 on FIG. 16.
Figure 19:
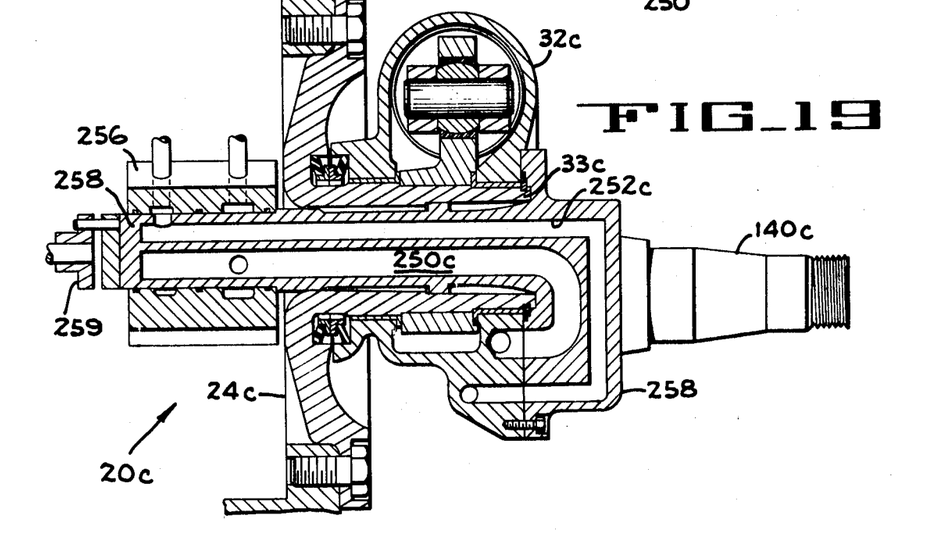
FIG. 19 is a section taken along lines 19—19 on FIG. 16.

Lockout operation, plus power raising the vehicle is effected by the FIG. 14 suspension unit 20b. The suspension unit 20b is characterized by an auxiliary cylinder 210 which has closed ends, and a separator piston 212 which floats in the cylinder. The unit 20b provides fail-safe operation in that it maintains a spring action and a predetermined ground clearance if any of its associated external hydraulic system is damaged.

Figures 9, 11:
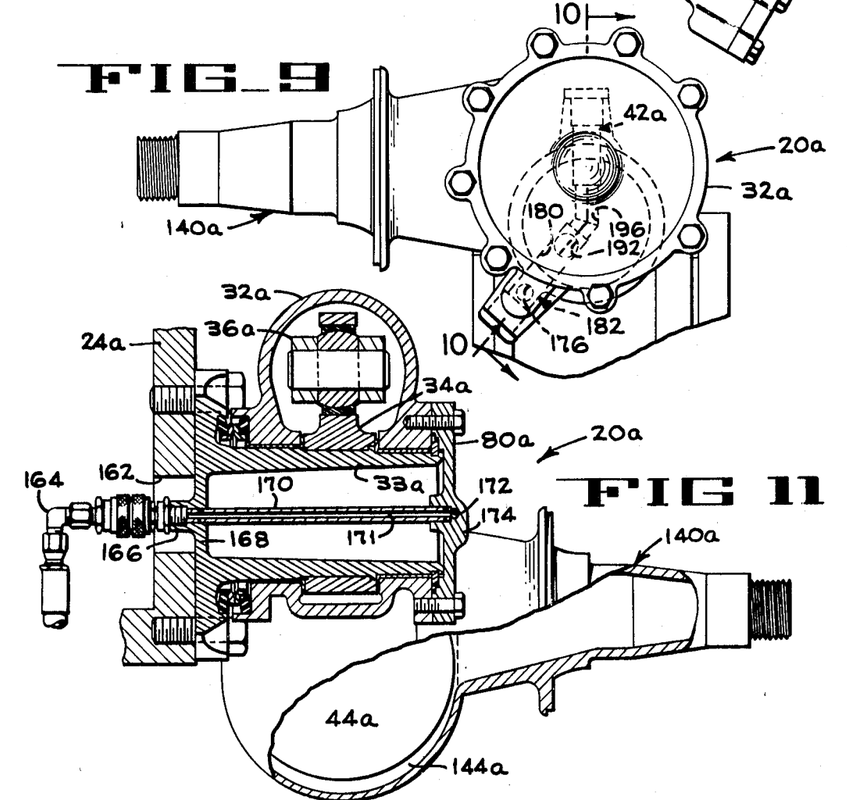
FIG. 9 is an end elevation, partly broken away, of a further embodiment of the suspension unit shown in the preceding FIGS.
FIG. 11 is a section taken along lines 11—11 on FIG. 10.

The lockout function described in connection with FIGS. 9–11 is effected in the same manner in the suspension unit 20b. Thus, the unit includes a longitudinal passage 214 (FIG. 14) which operates the same as the passage 176 (FIG. 10), and with a damper valve 216 and a lockout valve 218 which are identical in construction and function with the damper valve 42a and the lockout valve 182. Passage 214 communicates through a passage 220 in a hub cap 222, with a floating conduit assembly 224 (FIG. 15). The conduit assembly 224 includes coaxially arranged inner and outer tubes 226 and 228, the inner one of which has an outside diameter smaller than the inside diameter of the outer one to provide a fluid passage 230 circumscribing the innermost passage 232. Passage 232 operates the lockout valve 218.

A passage 234 in a hollow hub 33b communicates with the passage 230 via radial ports and an external circumferential groove on the outer tube 228, and is connected to a hydraulic line 236. Fluid transferred through this line actuates the floating piston 212. By a structure similar to that described, the other end of the passage 230 transmits fluid into a hub cap passage 238 (FIG. 14) and into the cylinder 210, and similarly, the passage 232 communicates with the lockout valve 218 through the hub cap passage 220. In the manner of the conduit 170 (FIG. 11), the conduit assembly 224 is cantilevered from the hub 33b and is capable of flexure to resist dynamic forces tending to misalign the end portions of the conduit assembly.

That portion of the cylinder 32b behind the piston 212 forms a variable volume chamber C which is adjusted by adding or withdrawing hydraulic fluid through the line 236 and passages 234, 230 and 238. The other side of the piston 212 confronts a chamber A1 which through a port 240 is connected to the main chamber A and is filled with hydraulic fluid. Thus, to lower the strut 32b and raise the hull 24b, fluid is added to the chamber C, thereby reducing the volume of chamber A1 and increasing the volume of fluid in the main chamber A to pivot the strut downward. Conversely reducing the volume of chamber C by bleeding off fluid will decrease the volume of fluid in the main chamber A and the strut will pivot upward to lower the vehicle. At any selected elevational position of the strut, the lockout valve 218 can be actuated in the manner previously described in connection with FIGS. 9-11 to prevent fluid transfer through the wall interposed between the piston 38b and the accumulator 44b and thereby rigidly lock the strut.

The volume relation among the chambers A, A1 and C is such that if the chamber C is at zero volume due to some hydraulic malfunction or damage, the fluid remaining in the strut in chambers A, A1 will maintain the hull 24b in a mobile condition with adequate ground clearance. This fail-safe operation is an important feature since it isolates each unit of the suspension system from the relatively more fragile hydraulic system. As in the case of the suspension units 20 and 20a, the unit 20b has the same heat-dissipating feature wherein its wheel spindle 242 is hollow and the lubricating oil in the spindle immerses the accumulator to conduct heat into the mass of the bogy wheel, not shown.

FIGS. 16-19 illustrate a suspension unit 20c, another embodiment of the invention which is useful with an accumulator remotely located in the hull, and which can be powered in either direction, to raise or lower the vehicle. The latter operation is necessary with some types of tracked vehicles because, as is a known problem in the art, the track will inhibit or prevent lowering of the vehicle by gravity.

The suspension unit 20c includes a strut 32c having passages 250 and 252 which respectively communicate with strut chambers A and A2 that are separated by a wall 254. A sealed plug 255 in the end of the strut 32c defines the outer end of the chamber A2. A fluid line connector block 256 (FIG. 19) inside the hull 24c is provided, in a known manner, with internal annular recesses that communicate with radial ports in a floating conduit assembly 258 to transmit fluid to or from passages 250c and 252c. The latter passages respectively communicate with the strut passages 250 and 252 to control the volume of fluid in the chambers A and A2. A coupling 259 on the inner end of the conduit assembly 258 is adapted to be connected to other control means which can sense the attitude of the strut 32c as a function of the rotative position of the conduit assembly, and which can therefore be utilized in an automatic height control system for the hull 24c.

The chamber A is provided with a piston 38c which is comparable to the main reaction pistons already mentioned in connection with the other embodiments. Chamber A2 is provided with a piston 260 that is connected to the piston 38c by a connecting rod 262 which is slidable through the wall 254 and an annular seal 263. The connecting rod has an enlarged head 264 which is secured to the end face of the piston 38c by a cap 266 threaded into the piston. It is important that the head 264 has transverse clearance in its enclosure so that any dynamic misalignment of the pistons 38c and 260, due to flexure of the strut 32c, will not react on the connecting rod. The other components of the suspension unit 20c not specifically mentioned are similar to those already described, and are believed to be self explanatory without specific reference.

It is apparent that by adding or withdrawing fluid from the chambers A and A2, the angular attitude of the strut 32c and wheel spindle 140c relative to the hub 33c can be adjusted with a powered motion in either direction to raise or lower the hull 24c. Further, by balancing the hydraulic pressure of the fluid in the chambers A and A2, the suspension unit 20c can be locked to immobilize the hull 24c at any selected elevation.

Figures 20, 21:
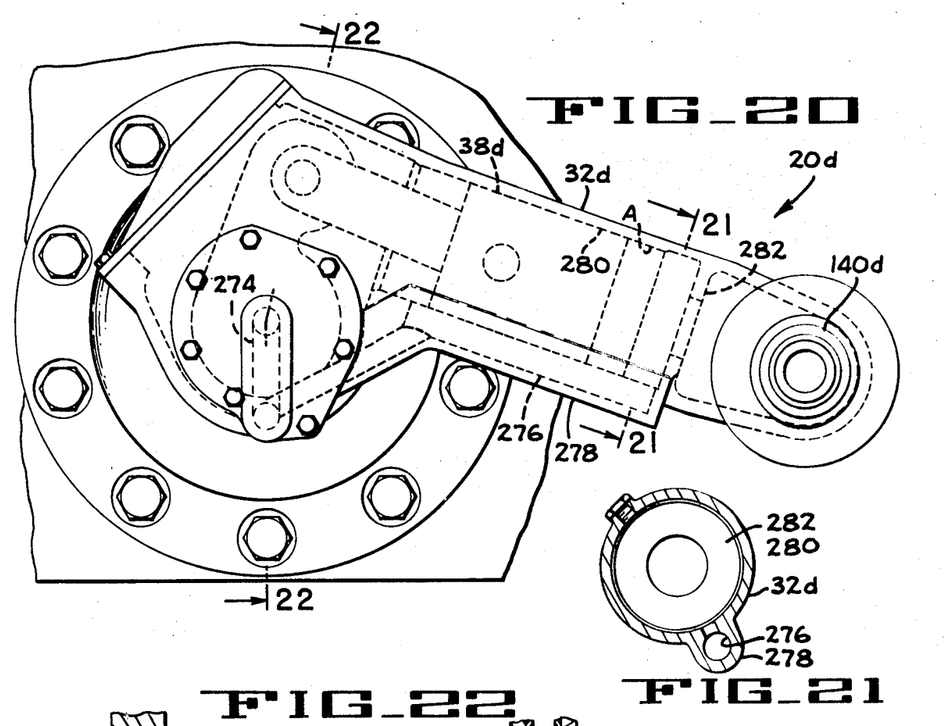
FIG. 20 is an elevation, partly broken away, of another embodiment of the suspension unit which incorporates power raising and a separate accumulator.
FIG. 21 is a section taken along lines 21—21 on FIG. 20.
Figure 22:
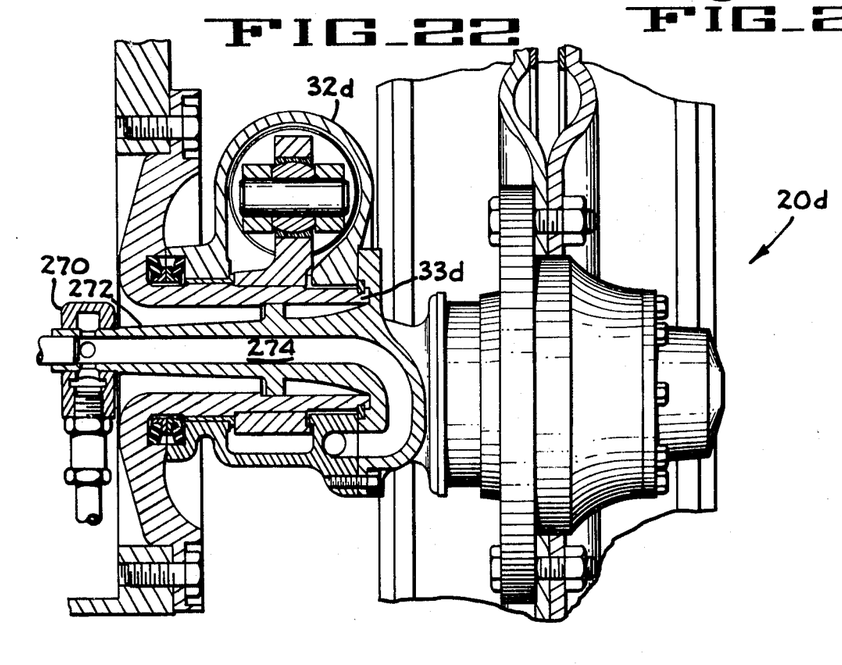
FIG. 22 is a section taken along lines 22—22 on FIG. 20.

FIGS. 20-22 illustrate a suspension unit 20d having an inboard accumulator, not shown, and a fluid chamber A which is connected to the accumulator by means including a swivel coupling 270. For this purpose, the hub 33d carries a conduit assembly 272 which is similar to those previously described in that it is cantilevered in the hub to prevent distortion and possible failure. The conduit assembly has a single passage 274 in communication with a passage 276 in the strut 32d. Passage 276 extends within a boss or rib 278 (FIG. 21) of the strut 32d and merges with a radial passage 289 to the chamber A. Chamber A is only partially closed by an apertured transverse wall 282, and the fluid in the strut fills both the chamber A and the hollow interior of the wheel spindle 140d. The strut 32d thus has the same cooling feature described in connection with FIG. 6; part of the heat generated by oscillation of the piston 38d relative to the strut is transferred into and dissipated by the bogey wheel 26.

In summary of the features of the disclosed suspension units, the dual purpose strut 32, 32a, 32b, 32c or 32d which carries the wheel and also forms the cylinder for the reaction piston 38, 38a, 38b, 38c or 38d is an improved structural arrangement in heavy duty hydropneumatic suspension systems because it reduces weight and cost, and more rapidly dissipates destructive heat, both through the cylinder-strut wall and through the oil in the hollow wheel spindle into the wheel. Further, each suspension unit approaches the ideal of a replaceable module because the replacement cost more nearly approximates the repair cost than in some comparable devices which are so complex and costly that fewer spare units are justified.

Other important features common to one or more of the illustrated and described embodiments of the invention include a marked reduction in vehicle weight, over 1100 pounds in one military vehicle presently using a different suspension system. In those structural embodiments which are self-contained, no hull apertures are required, a useful aspect of the invention for amphibious vehicles. The suspension units also eliminate the relatively vulnerable shock absorbers presently used, and are interchangeable, without hull modifications, with some present suspension units. All interior hull space is free of suspension controls or components when the self-contained suspension units are employed. Incidental benefits of all embodiments are that they provide a more efficient spring action than the conventional torsion bar and allow as much or more wheel travel, and that the projected costs on a mileage basis will be about 25 percent less than ordinary systems.

Although the best mode contemplated for carrying out the present invention has been herein shown and described, it will be apparent that modification and variation may be made without departing from what is regarded to be the subject matter of the invention as set forth in the appended claims.

What is claimed is:

1. In a hydropneumatic wheel suspension unit for a vehicle including a pivotable wheel support strut, a road wheel on the free end of said strut, a piston within said strut arranged for axial movement in response to pivotal movement of said strut, and an accumulator in said strut for resisting the movement of said piston, the improvement wherein said strut is tubular and is provided with an interior surface which forms the working cylinder for said piston, said accumulator being mounted in the free end of said strut, a self-aligning coupling carried by said piston rod and interconnecting said piston and said anchor arm to accommodate dynamic misalignment of said strut relative to said anchor arm, and a hollow wheel spindle extending from said strut, said spindle being in fluid communication with the fluid reacted against by said piston and said accumulator to transfer the heat generated internally under operating conditions externally into the road wheel.

2. In a hydropneumatic wheel suspension unit including a hollow pivotable wheel support strut carrying a road wheel and having liquid damping means to resist pivotal movement of the strut, the improvement comprising a tubular spindle for the road wheel, a hollow wheel hub mounted on said spindle, and means dynamically sealing the inner end portion of said hub to said spindle, the inside surface of said hub being in heat transfer communication with said damping means through said hollow spindle so that part of the heat generated in said damping means during operation of said suspension unit is dissipated to atmosphere from both the hub and wheel.

3. Apparatus according to claim 2 wherein said damping means includes a body of hydraulic fluid contacting the inner surfaces of said hub, said spindle and said strut, part of the heat generated in said fluid during operation of said suspension unit thus being conducted to and radiated from the strut, the hub, and the wheel.

4. A vehicle suspension unit comprising an elongate hollow strut, means mounting one end portion of said strut on a vehicle for pivotal movement about a substantially horizontal axis, a hollow wheel spindle projecting from the other end portion of said strut parallel to said axis, a wheel mounted on said spindle, the interior of said hollow spindle being in fluid communication with the interior of said hollow strut, and hydropneumatic spring means including a piston and accumulator for resiliently damping pivotal movement of said strut, a body of liquid filling said hollow wheel spindle and being in heat transfer relation with said hydropneumatic spring means, said body of liquid conducting the operating heat generated by said spring means into the wheel through said hollow wheel spindle, whereby the wheel provides an air cooled heat sink to dissipate the operating heat of the suspension unit.

5. Apparatus according to claim 4 wherein said pivot means includes a tubular hub bolted to the hull, said hub having a transverse wall adjacent the hull and an opposite open end, a conduit extending through said hub and having one end portion cantilevered in said wall, a hub closure bolted to said strut in overlying relation with the open end of said hub, and means defining an inwardly open socket in said hub closure for laterally restraining but accommodating axial movement of said conduit, said conduit being capable of flexure so that dynamic forces tending to misalign said conduit and tending to change the interspacing of the hull and hub closure have minimal effect on the cantilevered conduit.

6. A vehicle suspension unit comprising an elongate strut defining a closed cavity, means mounting one end portion of said strut on a vehicle for pivotal movement about an axis transverse to the direction of vehicle movement, a hollow wheel spindle projecting from the other end portion of said arm parallel to said axis, a wheel mounted on said spindle, the interior of said spindle being in fluid communication with the interior of said strut, and hydropneumatic spring means including a piston and accumulator within said arm for resiliently damping pivotal movement of said strut, said accumulator operating in a body of liquid enveloping said accumulator and filling said hollow wheel spindle, the wheel forming an air cooled heat sink to dissipate the operating heat generated by said accumulator and conducted to the wheel through said hollow wheel spindle.

7. Apparatus according to claim 6 wherein said support arm defines a cylindrical bore and provides the operating cylinder for the piston to eliminate the weight and cost of an otherwise required separate piston cylinder.

8. Apparatus according to claim 7 wherein said accumulator is coaxially mounted in the free end portion of said cylinder and said wheel spindle is located intermediate the ends of said support arm to minimize the overall length of said suspension unit.

9. A hydropneumatic vehicle suspension unit comprising an elongate hollow suspension arm including a closed bell end portion, a reservoir housing at the other end, and an intermediate portion having a cylindrical bore, a fixed pivot shaft pivotally connecting the reservoir end of said suspension arm to a vehicle, an anchor arm fixed to said pivot shaft, a piston movable in said bore, a piston rod interconnecting said piston and said anchor arm, a gas-charged spherical accumulator mounted in said bell end portion of the suspension arm and having an inlet port exposed to fluid transferred by said piston, hydraulic fluid forming a liquid column between said piston and the inlet port of said accumulator, a hollow wheel spindle projecting laterally from said bell end in fluid communication with the interior of said bell end, and a body of heat transfer liquid internally flooding said bell end and said wheel spindle, oscillation of said suspension arm about said pivot shaft effecting relative axial movement between said piston and said cylinder so that the hydraulic fluid reacts against the gas cushion of said accumulator, heat thus developed from friction and compression being directly conducted by the heat transfer liquid through said hollow wheel spindle into the wheel hub and wheel for dissipation into the atmosphere.

10. Apparatus according to claim 9 and stop means limiting the maximum upward pivotal movement of said strut, said accumulator including a metal shell enclosing a flexible gas charged bladder, the gas charge of said accumulator expanding said bladder outward into contact with the surrounding metal shell before said suspension arm attains its maximum upward movement, fluid leaking past the piston accumulating in said reservoir housing, the pressure of the hydraulic fluid intermediate said piston and said accumulator thus dropping below the pressure of the hydraulic fluid in said reservoir housing to create a pressure differential across the piston, and a one-way valve mounted in said piston and operable to transfer fluid from said reservoir through the piston under said pressure differential conditions.

11. Apparatus according to claim 9 and a hydraulically actuated lockout valve arranged to control the inlet port of said accumulator, said lockout valve being operable to block the transfer of fluid between said piston to said accumulator in order to immobilize the suspension unit, and means defining an internal passage through said strut and into the vehicle hull for the remote hydraulic operation of said valve.

12. In a wheel suspension unit for a vehicle including a hollow wheel support strut carrying a road wheel mounted on one end of the strut; pivot means connecting the other end portion of said strut to the vehicle for pivotal movement of said arm about a substantially horizontal axis; a piston movable axially within the strut as the strut swings about its pivot axis to the vehicle, said piston being arranged to react against hydraulic fluid during pivotal movement of said strut; the improvement comprising a hollow wheel spindle carried by and communicating with the interior of said strut, a hollow wheel hub mounted on said spindle and providing an inwardly open annular chamber circumscribing said wheel spindle, means providing a dynamic seal between the open end portion of said hub and said spindle, and a body of hydraulic fluid substantially filling said strut, said spindle and said hub, the heat generated by operation of said piston thus being conducted by the hydraulic fluid and radiated from the strut, the hub and the wheel.

PO-1050
(5/69)

UNITED STATES PATENT OFFICE
CERTIFICATE OF CORRECTION

Patent No. 3,602,470  Dated August 31, 1971

Inventor(s) RALPH K. REYNOLDS

It is certified that error appears in the above-identified patent and that said Letters Patent are hereby corrected as shown below:

Col. 3, line 48, change "on" to -- of --
Col. 6, line 62, delete "32b" and insert -- 210 --
Col. 7, line 72, change "289" to -- 280 --

Signed and sealed this 6th day of June 1972.

(SEAL)
Attest:

EDWARD M. FLETCHER, JR.
Attesting Officer

ROBERT GOTTSCHALK
Commissioner of Patents